United States Patent [19]

Pape

[11] Patent Number: 5,336,755
[45] Date of Patent: Aug. 9, 1994

[54] PROCESS FOR THE RECOVERY OF POLYMERS DISSOLVED IN AQUEOUS ALKALINE OR ACID MEDIA

[75] Inventor: Richard F. Pape, Gerlafingen, Switzerland

[73] Assignee: Belland AG, Switzerland

[21] Appl. No.: 10,203

[22] Filed: Jan. 27, 1993

[30] Foreign Application Priority Data

Jan. 28, 1992 [DE] Fed. Rep. of Germany ....... 4202248

[51] Int. Cl.$^5$ .................... C08J 3/07; C08J 11/16; C08J 11/26
[52] U.S. Cl. .................... 528/486; 521/40.5; 521/43.5; 523/332; 528/487; 528/491; 528/490
[58] Field of Search ................ 521/42, 40.5, 41, 43.5; 523/332; 528/486, 487, 488, 491, 490; 210/702, 724, 738, 783, 725

[56] References Cited

U.S. PATENT DOCUMENTS

| | | | |
|---|---|---|---|
| 3,032,545 | 5/1962 | Renberg | 210/783 |
| 3,960,485 | 6/1976 | Fanti et al. | 428/262 |
| 4,612,355 | 9/1986 | Belz | 526/65 |
| 4,870,148 | 9/1989 | Belz et al. | 526/318.41 |
| 4,990,146 | 2/1991 | Deibig et al. | 526/332 |
| 5,094,912 | 3/1992 | Deibig et al. | 428/355 |

FOREIGN PATENT DOCUMENTS

| | | | |
|---|---|---|---|
| 0488375 | 1/1992 | European Pat. Off. | 521/40 |
| 0468375 | 5/1992 | European Pat. Off. | |
| 0469402 | 6/1992 | European Pat. Off. | |
| 0132588 | 8/1982 | Japan | 210/724 |
| 0000291 | 1/1983 | Japan | 210/702 |
| 0297330 | 12/1987 | Japan | 528/486 |

*Primary Examiner*—Paul R. Michl
*Assistant Examiner*—Peter Szekely
*Attorney, Agent, or Firm*—Quarles & Brady

[57] ABSTRACT

The invention relates to a process for the recovery of polymers dissolved in an aqueous alkaline or acid medium by precipitating the polymers with acid or alkaline precipitants, the precipitation being initiated in a strong aqueous flow and the precipitated polymers separated from the aqueous medium.

30 Claims, 2 Drawing Sheets

PROCESS FOR THE RECOVERY OF POLYMERS DISSOLVED IN AQUEOUS ALKALINE OR ACID MEDIA

DESCRIPTION

The invention relates to a process for the recovery of polymers dissolved in aqueous alkaline or acid media by precipitating with acid or alkaline precipitants. In order to avoid waste, protect the environment and recover recyclable materials, it has been proposed that packing materials, food containers, plates and dishes, such as those used at parties, labels, particularly those on bottles and crates, be made from plastics materials, which are waterproof or insoluble at neutral pH-values and under use conditions diverging from the neutral pH-value, but which are soluble in the opposite pH-range. Thus, DE-OS 3,738,786 (U.S. Pat. No. 5,094,912) describes labels made from polymers dissolvable in an aqueous alkaline medium. DE-OS 3,435,468 (U.S. Pat. No. 4,870,148) and DE-OS 3,335,954 (U.S. Pat. No. 4,612,355) describe the production and further use of similar polymers. DE-OS 3,742,472 (U.S. Pat. No. 4,990,146) describes the production and use of plastics having alkaline groups, which are soluble in an aqueous acid medium and which can be reprecipitated by adding alkali.

In the hitherto known precipitation processes, which are performed in conventional reaction vessels, such as stirred vessels or flasks, particularly during the processing of plasticizer-containing plastics or plastic mixtures, which contain a proportion of tacky polymers, problems occur as a result of the precipitation products sticking together. The precipitated particles adhere as a result of their own tackiness to the walls of the precipitating and separating means and as a result of accumulation there of further adhering polymer particles lead to blockages. The precipitated polymers are generally obtained in a form from which they can only be processed with difficulty and cannot be granulated in a satisfactory manner without prior treatment.

The problem of the invention is to permit the reprocessing of dissolved polymers to easily processable and in particular granular products.

This problem is solved by initiating the precipitation of the polymers from their solutions in a strong aqueous flow, followed by a separation of the precipitated polymers from the aqueous medium.

The polymer solutions are in particular prepared by dissolving plastic waste, particularly waste which is mixed with insoluble products or other plastics, in bases or acids and followed by the separation and in particular centrifuging thereof from solid admixtures.

As a result of the rapid, intimate mixing of the polymer solution and the precipitant in a tubular flow a large number of polymer particles is formed. An additional advantage of the invention is that without the addition of adjuvants and in particular without the addition of surface-active substances, phosphorus-containing surfactants or emulsifiers and without the addition of solvents, it is possible for working to take place. Nevertheless, readily processable coagulates are obtained, which are free from additional admixtures, which improves the reusability and environmentally friendly nature. The rapid, turbulent mixing preferably takes place for a period of 0.1 to 2.0 sec. and preference is given to a period of 0.8 to 1.0 sec. To achieve a rapid mixing, the precipitant is preferably added in the form of a liquid or solution. The ratio of the volume flows of polymer solution to precipitant is not critical and is preferably 6 to 8:1 and in particular 7:1. Precipitation can take place at normal temperature, preference being given to the range 20° to 25° C.

The turbulent mixing is preferably performed with the aid of a pump, in which the polymer solution and precipitant are brought together. A high pressure centrifugal pump is e.g. suitable as the mixing pump. Preferably turbulent mixing takes place in an open pump, particularly an open centrifugal pump. However, it is also possible to separately place under pressure the volume flows of the polymer solution and precipitant and bring them together and intermix them under pressure relief, e.g. with the aid of a static mixer.

Preferably the precipitant is injected into the reaction pump. During the mixing of the polymer solution and the precipitant at least the precipitant can be supplied under pressure, which is advantageously at least 5 bar. The aqueous solution of the plastics can generally be supplied by suction to the reaction pump. In a further embodiment of the invention preference is given to the supply of the polymer solution under pressure. The supply of the two reactants to the reaction pump can in particular take place by means of a concentric feed line, the precipitant preferably being carried in the inner line. According to a preferred embodiment the concentric nozzle has an internal diameter of 1 inch. An inner line, through which the polymer solution is introduced in an annular flow, in particular has a diameter of 10 mm. On the outlet side the pump reaches a pressure of at least 5 bar.

It has been found that the polymers can be particularly favourably precipitated if the polymer solution concentration prior to combining with the precipitant is 0.5 to 15 and preferably 3 to 5% by weight. As a function of the polymer to be precipitated, variations thereof are possible. It is without difficulty possible to have a flow rate of 2000 to 4000 l/h, normally approximately 3000 l/h per pump or pumping mechanism, the flow rate being essentially dependent on the pump capacity. Advantageously working takes place with a pump capacity of up to 10 $m^3$/h.

The process according to the invention is particularly suitable for the processing of mixtures of polymers, which are dissolved in aqueous alkaline or acid media and following precipitation polymer mixtures are recovered.

With particular advantage there is a residence time of at least 20 to 30 minutes between the precipitation of the polymers in the strong aqueous flow and their separation from the aqueous medium. It has been found that during a period of approximately 30 minutes following the addition of the precipitant polymer material is precipitated.

A corresponding residence time gives as an additional effect an increased precipitation product yield and therefore a better polymer recovery rate. Such a residence time is particularly preferred in the case of non-tacky polymers. When recovering tacky polymers separation preferably takes place within a short time following precipitation. With solutions of polymer mixtures with at least 15% tacky polymer, particularly based on butyl acrylates, the hydrophobic groups lead to a rapid precipitation from the aqueous solution. As a result of their tackiness the precipitated polymer particles rapidly coagulate and can therefore be separated after a short time. The filter cakes obtained can have solid contents of over 60%.

Prior to their separation from the aqueous medium, the precipitated polymers can in particular undergo a maturing or ripening stage, which is essentially performed in a quiet flow. The maturing phase can e.g. be performed in a reaction vessel accompanied by slow stirring. The Reynolds number during the flow is below 1000 and preferably below 100. Particularly good results are obtained with values of 0.5 to 10. A maturing period of 2 to 4 and in particular 2.5 to 3 minutes is generally sufficient. In another embodiment of the invention a maturing period of 20 to 40 minutes is preferred.

The process conditions can be so matched by the different process parameters and in particular the degree of turbulence and the following residence phase, that the precipitated polymers, after maturing, have a particle size or cross-section of 0.01 to 100 mm$^2$.

Following the ripening or maturing separation takes place of the liquid medium from the precipitated polymer particles, preferably in a substantially and in particular completely pressureless manner. For this purpose is e.g. suitable a filter, particularly a belt filter, in which the filtrate can e.g. run through a Teflon-coated polyester fabric belt and the precipitated polymers are increasingly drained on the belt. In another embodiment of the invention it is advantageous to use a filter press for separating the polymers. The filter cake obtained has 20 to 50% dry substance. In the case of precipitated polymers with hydrophobic polymer fractions, filter residues with a solid content of 60 to 80% can be obtained. By further draining and in particular by careful squeezing, the polymers can be further dried to a water content of below 50% by weight.

In this form the polymers are particularly suitable for further processing in an extruder and for further draining it is preferable to use an extruder having degassing means. Due to the fact that the polymers are no longer tacky, they are suitable for the direct loading of the extruder. On melting the particles in the extruder the water escapes in vaporous form, so that at the end of the extruder the polymer melt passes out with the desired cross-sectional shape. It is also possible to mix the polymers in the extruder in conventional manner with additives and in particular pigments, stabilizers, etc., to the extent that this is desired or necessary. In general, the polymer melt is initially discharged in the form of strands from the extruder and pelletized. This makes it possible to carry out an intermediate storage or, if desired, a mixing with other pellets or granulates.

The nature of the precipitation reaction is on the one hand dependent on the nature of the polymer to be precipitated and on the other on the desired process control. For the precipitation of polymers containing acid groups and in particular carboxyl groups, it is possible to use inorganic acids, organic acids and/or acid reacting salts. During precipitation the pH-value is normally below 6 and in particular between 2 and 3. Suitable inorganic acids are mineral acids and in particular sulphuric and phosphoric acid. A suitable acid reacting salt is in particular aluminium sulphate and, apart from the pH-shift, the function of Al$^{3+}$ as a coagulation aid is significant. Acid aluminium salts are preferred if it is desirable for aluminium oxyhydrate to remain in the precipitated polymer. The filtrate solution can at least partly be recycled and reused and optionally sulphate or phosphate ions enriched in excess can be removed every so often by precipitation.

However, other suitable precipitants are relatively strong organic carboxylic acids and in particular biodegradable carboxylic acids such as lactic, tartaric, malic and in particular citric acid. These organic acids can in simple manner undergo biological decomposition and in particular fermentation, so that they can be disposed of in an environmentally friendly manner. Particular preference is given to these organic acids, if the solution of the polymers, prior to the precipitation thereof, undergo a bacterial decomposition in order to eliminate carried over impurities. In this case the filtrate of the polymer precipitation can be returned to the inlet side of the bacterial decomposition and used for adjusting the conditions of the biological fermentation and also as a nutrient substrate for bacteria.

It is possible to use as polymers with acid groups, particularly carboxyl groups, more particularly copolymers of neutral vinyl monomers with $\alpha,\beta$-unsaturated monocarboxylic and/or dicarboxylic acids and/or anhydrides of carboxylic acids. The carboxylic acids can in particular be acrylic, methacrylic, crotonic, iraconic and maleic acid. Suitable vinyl monomers are alkyl acrylates and alkyl methacrylates, preference being given to those with 1 to 8 and in particular 1 to 6 carbon atoms in the alcohol component, together with styrene. The polymers can also be in the form of terpolymers, the termonomer preferably being a neutral vinyl monomer, which differs from the other neutral monomer. Such polymers are known and are e.g. described in the aforementioned U.S. Pat. Nos. 4,612,355, 4,870,147 and 5,094,912.

As a function of the hydrophobic character of the neutral monomet, the carboxyl group content is preferably adjusted in such a way that the polymers are insoluble in the neutral and acid medium and soluble in the alkaline medium at above pH 8 to 9 and reprecipitatable by acidification.

Polymers, which are insoluble in the neutral and basic medium, but soluble in the acid medium, are copolymers of styrene with acrylates, as well as copolymers of styrene with methacrylates or termonomers of the styrene/acrylate/acrylate or styrene/methacrylate/acrylate or styrene/methacrylate/methacrylate type and preferably copolymers of the aforementioned neutral vinyl monomers with dialkyl aminoalkyl acrylates or methacrylates, such as are e.g. described in DE-OS 3,742, 472. These polymers can also be in the form of terpolymers. As opposed to the aforementioned polymers, these polymers can be dissolved by adding acids and reprecipitated from the acid solutions by alkalineacting precipitants. The process can otherwise be performed in the manner described hereinbefore.

Further features of the invention can be gathered from the following description of preferred embodiments in conjunction with the drawings and subclaims. The individual features can be realized singly or in the form of subcombinations in a embodiment.

Figure 1:
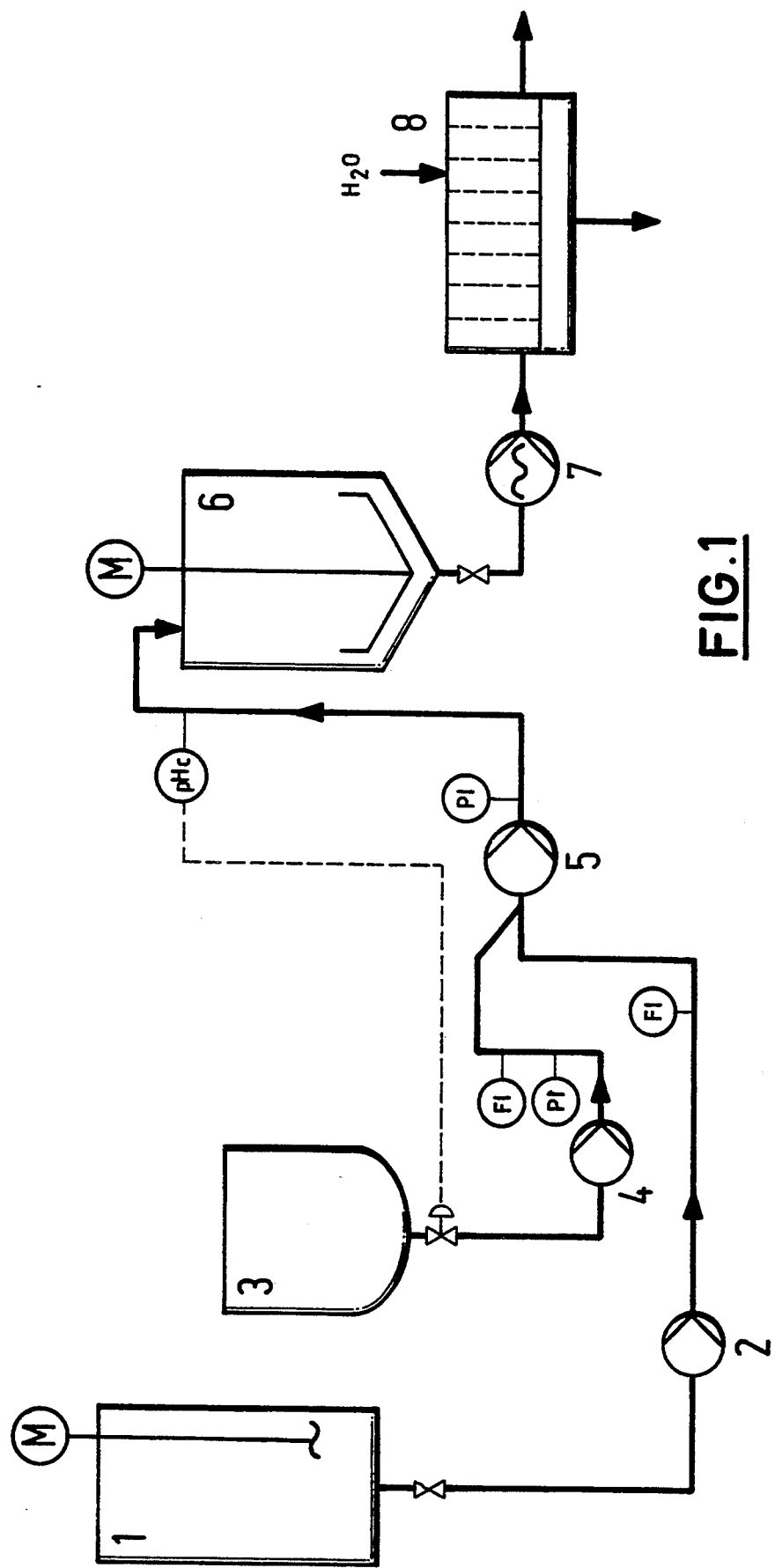
FIG. 1 is a process diagram for the performance of an embodiment of the process according to the invention, based on dissolved polymers.
Figure 2:
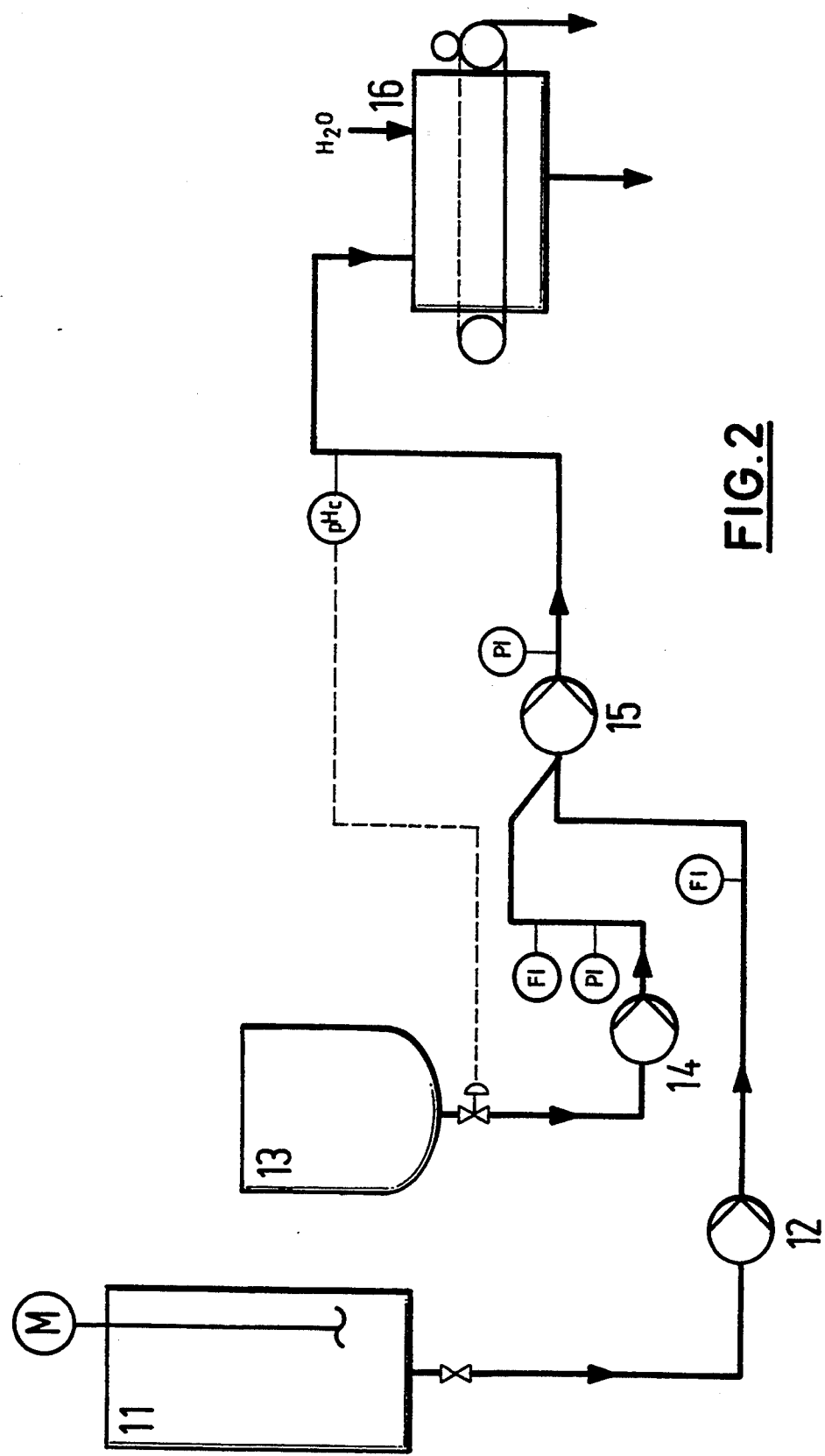
FIG. 2 is a process diagram for performing another embodiment of the invention.

The processes represented in FIGS. 1 and 2 are explained hereinafter relative to Examples 1 and 2.

EXAMPLE 1

The plastics to be recovered are initially coarsely comminuted in a shredder and then mixed with aqueous caustic soda solution in a pulper. A suspension is formed, which contains the dissolved plastics, dissolved organic constituents and finely divided, undissolved garbage or waste. This suspension undergoes a solid/liquid separation for removing the undissolved substances and then the aqueous alkaline polymer solution is freed from the organic admixtures in an appropriate manner, e.g. by bacterial decomposition.

The purified alkaline polymer solution is continuously sucked by a reaction pump at 300 kg/h from the container 1 by means of a measuring device, such as e.g. a flowmeter, preferably a mass flowmeter, or is supplied by means of a metering pump 2 to the reaction pump. The alkaline polymer solution with a pH of 9.5 contains 8.5% polymer mixture and at a density of 1.02 g/cm$^3$ has a viscosity of 225 mPas. The plastics in the solution can comprise copolymers of methacrylic acid with ethyl acrylate (molar ratio 1:4), methacrylic acid with methyl acrylate (molar ratio 1:4) and acrylic acid with styrene (molar ratio 1:1.75). From the precipitant container 3 using a metering pump 4 continuously 63 kg/h of a 4% aqueous sulphuric acid solution is dosed by means of a measuring device, e.g. a flowmeter, preferably a mass flowmeter, into the reaction pump 5. The precipitant is injected into the reaction pump and is under a pressure of 5 bar. The supply of the two reactants to the reaction pump advantageously takes place by means of a concentric feed line (not shown in the drawing), the acid being carried in the inner line and which has a concentric nozzle with an internal diameter of 1 inch. The outer line with an annular cross section, through which the polymer solution is introduced in an annular flow, has a diameter of 10 mm.

The reaction pump is designed in such a way that by an open construction a blockage with the polymer deposit which forms can be avoided. The pump can build up pressures of 5 to 6 bar. Preferably use is made of an open centrifugal pump. As a result of the intense mixing of the alkaline polymer solution with the acid, within the pump the carboxyl-containing plastic starts to reform, no longer being water-soluble and is precipitated as a solid. The precipitation reaction is monitored with a pH-meter, which also regulates the dosing of the precipitant. The initially formed small particles in the acid mother liquor at pH 3 to 4 pass into an intermediate container 6, where with a quiet flow and slow stirring for 35 to 40 minutes the polymers completely precipitate and the particles undergo a ripening process.

The fine polymer particles coagulate and grow to particles with a diameter of 0.2 to 1 mm, which are then passed as a pasty precipitation product by an eccentric screw pump 7 into a filter press 8. The outflowing filtrate can be drained off and optionally, following preparation, can again be used for dissolving polymers. Following the separation of the acid filtrate, the polymer filter cake is washed with water to remove acid residues. The filter cake contains 25 to 30% dry substance. It is then dried, ground and compounded for new uses.

EXAMPLE 2

The alkaline polymer solution e.g. collected in a washing plant for objects provided with removable labels is sucked by a metering pump 12 at 1200 kg/h from a container 11 using a measuring device, such as e.g. a flowmeter, preferably a mass flowmeter and is passed to a reaction pump 15, or is directly sucked by the reaction pump, e.g. a high pressure centrifugal pump. The alkaline polymer solution at pH 10 contains a mixture of 85% sheet polymer and 15% tacky polymer with a total content of 8% dry substance, which with a density of 1.02 g/cm$^3$ has a viscosity of 40 mPas. The dissolved plastics can consist of copolymers of methacrylic acid with ethyl acrylate (molar ratio 1:3.5) and acrylic acid with butyl acrylate (molar ratio 1:4). It also contains suspended titanium dioxide, which is used as a pigment in label material.

From the precipitant container 13 by means of a metering pump 14 continuously and under the control of a measuring device, such as e.g. a flowmeter, 93 kg/h of an 8% aqueous sulphuric acid solution is fed into the alkaline polymer solution in the reaction pump 15. An optimum performance of the precipitation reaction is ensured by the intense mixing action and the preferably open construction of the reaction pump 15. The precipitation reaction is monitored by a pH-meter, which also regulates the precipitant dosing. As a result of the content of tacky polymers, the polymers initially precipitated as a finely divided deposit rapidly coagulate to large particles. The polymer deposit forming in the pump is passed under pressure to a belt filter 16, where it is separated from the acid mother liquor at a pH of 3 to 4. In order to avoid sticking of the tacky polymer-containing precipitation product on the belt filter, a Teflon-coated polyester belt is used. After washing out acid residues and squeezing a filter cake with a 60 to 65% dry substance content is obtained. The filter cake is dried, ground and the pulverulent or granular polymeric material can be processed in the above-described manner and supplied for reuse. The filtrate can be returned to the washing plant as a rinsing liquid until the sulphate content has been so enriched that there is a conventional precipitation, e.g. in the form of gypsum.

I claim:

1. A process for the recovery of polymers dissolved in aqueous alkaline or acid media by precipitating the polymers with acid or alkaline precipitants, wherein the precipitation is initiated in a turbulent flow and the precipitated polymers are separated from the aqueous medium.

2. A process according to claim 1, wherein precipitation takes place under turbulent mixing.

3. A process according to claim 2, wherein the turbulent mixing is performed with the aid of a pump.

4. A process according to claim 2, wherein the turbulent mixing is performed in an open pump.

5. A process according to claim 1, wherein mixtures of polymers dissolved in aqueous alkaline or acid media are used and polymer mixtures are recovered.

6. A process according to claim 1, wherein between the precipitation of the polymers in a turbulent flow and their separation from the aqueous medium, there is a residence time of at least 20 to 30 minutes.

7. A process according to claim 1, wherein in the case of tacky polymers a separation from the aqueous medium takes place within about 2 to 4 minutes following precipitation.

8. A process according to claim 1, wherein the precipitated polymers undergo maturing or ripening prior to the separation from the aqueous medium.

9. A process according to claim 8, wherein the maturing or ripening is performed in a substantially laminar flow.

10. A process according to claim 8, wherein a ripening time lasts 2 to 4 min.

11. A process according to claim 8, wherein a ripening time is 20 to 40 min.

12. A process according to claim 8, wherein the turbulence and the following ripening are so matched to one another that after ripening the precipitated particles are obtained with a cross-section of 0.01 to 100 $mm^2$.

13. A process according to claim 1, wherein the precipitated polymers are separated from the liquid medium substantially without applying pressure.

14. A process according to claim 1, wherein the precipitated polymers are separated from the liquid medium with the aid of a filter press.

15. A process according to claim 1, wherein the precipitated polymers are separated from the liquid medium with the aid of a belt filter.

16. A process according to claim 1, wherein the precipitated polymers are separated with a water content of 50 to 80% by weight.

17. A process according to claim 1, wherein precipitated polymers with hydrophobic polymer fractions are obtained with a solid content of 60 to 80%.

18. A process according to claim 1, wherein separated polymers are predried to a water content of less than 50% before further processing.

19. A process according to claim 1, wherein separated polymers are fed into an extruder and processed to a substantially anhydrous product.

20. A process according to claim 19, wherein precipitated polymers are processed with the aid of an extruder to pellets or granules.

21. A process according to claim 3, wherein the turbulent mixing is performed with the aid of a centrifugal pump.

22. A process according to claim 3, wherein the turbulent mixing is performed in an open centrifugal pump.

23. A process according to claim 1, wherein in the case of non-tacky polymers between the precipitation of the polymers in a turbulent flow and their separation from the aqueous medium, there is a residence time of at least 20 to 30 minutes.

24. A process according to claim 1, wherein in the case of tacky polymers based on butyl acrylate, a separation from the aqueous medium takes place within about 2 to 4 minutes following precipitation.

25. A process according to claim 1, wherein the separated polymers are pressed out to a water content of less than 50% before further processing.

26. A process according to claim 19, wherein separated polymers having a water content of less than 50% by weight are fed into an extruder, and processed to a substantially anhydrous product.

27. A process according to claim 19, wherein the separated polymers are fed into an extruder having degassing means and processed to a substantially anhydrous product.

28. A process according to claim 9, wherein a ripening time lasts 2 to 4 min.

29. A process according to claim 9, wherein a ripening time is 20 to 40 min.

30. A processing according to claim 26, wherein the separated polymers are fed into an extruder having degassing means and processed to a substantially anhydrous product.

* * * * *